(12) United States Patent
Gronstedt et al.

(10) Patent No.: US 12,459,682 B2
(45) Date of Patent: Nov. 4, 2025

(54) LANDING PLATFORM

(71) Applicant: HHLA Sky GmbH, Hamburg (DE)

(72) Inventors: Matthias Gronstedt, Hamburg (DE); Olaf Hilbig, Kirchlengern (DE); Stefan Oluschinsky, Kirchlengern (DE); Marius Schröder, Bielefeld (DE)

(73) Assignee: HHLA Sky GmbH, Hamburg (DE)

( * ) Notice: Subject to any disclaimer, the term of this patent is extended or adjusted under 35 U.S.C. 154(b) by 10 days.

(21) Appl. No.: 18/692,651

(22) PCT Filed: Sep. 15, 2022

(86) PCT No.: PCT/EP2022/075714
§ 371 (c)(1),
(2) Date: Oct. 10, 2024

(87) PCT Pub. No.: WO2023/041679
PCT Pub. Date: Mar. 23, 2023

(65) Prior Publication Data
US 2025/0145314 A1    May 8, 2025

(30) Foreign Application Priority Data
Sep. 16, 2021 (DE) .................... 102021123990.7

(51) Int. Cl.
*B64U 70/97* (2023.01)
*B64F 1/32* (2006.01)
*B64U 70/99* (2023.01)

(52) U.S. Cl.
CPC .............. *B64U 70/97* (2023.01); *B64F 1/322* (2020.01); *B64U 70/99* (2023.01)

(58) Field of Classification Search
CPC ........... B64U 80/70; B64F 1/007; B64F 1/005
See application file for complete search history.

(56) References Cited

U.S. PATENT DOCUMENTS 3,253,806 A * 5/1966 Eickmann ............... B64C 27/12
244/17.23
3,483,696 A * 12/1969 Gilbert .................... B64C 27/08
416/157 R
(Continued)

FOREIGN PATENT DOCUMENTS

CN    106503954 A      3/2017
CN    112079065    * 12/2020    ............. B65G 35/00
(Continued)

OTHER PUBLICATIONS

International Search Report issued in application No. PCT/EP2022/075712 dated Feb. 1, 2023.
(Continued)

*Primary Examiner* — Medhat Badawi
(74) *Attorney, Agent, or Firm* — Rouget F. Henschel; Potomac Law Group, PLLC

(57) ABSTRACT

The invention relates to a landing platform for a drone (6), comprising a landing surface comprising two conveyor belts (2) which are arranged parallel in the same horizontal plane and which are spaced apart such that a drone (6) standing on the landing surface can simultaneously have contact with both conveyor belts (drone conveyor belts), two sliding bars (3) which each extend at least partially parallel to the running direction of the drone conveyor belts (2) and can be moved toward each other above the drone conveyor belts in a direction perpendicular to the running direction of the drone conveyor belts so that the sliding bars can slide a drone (6) standing on the landing surface, and a loading unit (5) comprising a lifting device (7) for cargo, the lifting device being arranged between the drone conveyor belts, wherein the drone (6) standing on the landing surface can be moved, by movement of the drone conveyor belts (2) and/or movement of the sliding bars (3), into a position in which the
(Continued)

Figure 1:
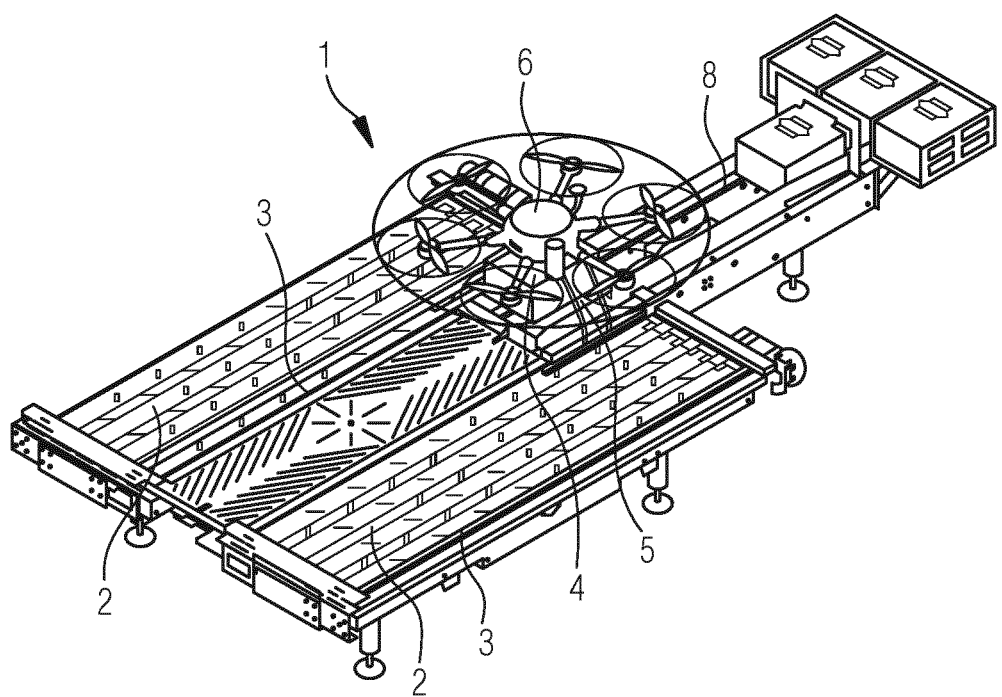

drone (6) can receive cargo arranged on the lifting device (7) (loading position).

24 Claims, 6 Drawing Sheets

(56) References Cited

U.S. PATENT DOCUMENTS

| | | | | |
|---|---|---|---|---|
| 4,262,712 A * | 4/1981 | Young | B67D 7/54 | |
| | | | 141/DIG. 1 | |
| 7,334,755 B2 * | 2/2008 | Svoboda, Jr. | B64C 27/08 | |
| | | | 244/17.23 | |
| 8,052,081 B2 * | 11/2011 | Olm | B64U 10/13 | |
| | | | 244/17.23 | |
| 8,245,469 B2 * | 8/2012 | Rubel | E04B 5/48 | |
| | | | 52/223.6 | |
| 8,256,172 B2 * | 9/2012 | Benson | E04F 15/02183 | |
| | | | 52/489.1 | |
| 8,511,606 B1 * | 8/2013 | Lutke | B64U 80/40 | |
| | | | 320/109 | |
| 9,050,997 B1 * | 6/2015 | Schramm | B62D 15/0215 | |
| 9,056,676 B1 * | 6/2015 | Wang | B64F 1/22 | |
| 9,126,693 B1 * | 9/2015 | Shi | G05B 11/42 | |
| 9,290,277 B2 * | 3/2016 | You | B64U 50/34 | |
| 9,387,928 B1 * | 7/2016 | Gentry | B64U 50/39 | |
| 9,421,869 B1 * | 8/2016 | Ananthanarayanan | | |
| | | | B60L 5/005 | |
| 9,446,858 B2 * | 9/2016 | Hess | B64F 3/02 | |
| 9,457,899 B2 * | 10/2016 | Duffy | B64U 10/16 | |
| 9,527,605 B1 * | 12/2016 | Gentry | G05D 1/0094 | |
| 9,551,989 B2 * | 1/2017 | Scarlatti | G05D 1/00 | |
| 9,589,448 B1 * | 3/2017 | Schneider | F41H 9/10 | |
| 9,643,722 B1 * | 5/2017 | Myslinski | G05D 1/689 | |
| 9,718,564 B1 * | 8/2017 | Beckman | G08G 5/57 | |
| 9,783,075 B2 * | 10/2017 | Henry | G05D 1/654 | |
| 9,783,301 B2 * | 10/2017 | Schliwa | B64D 11/0007 | |
| 9,957,045 B1 * | 5/2018 | Daly | B64U 50/19 | |
| 10,099,561 B1 * | 10/2018 | Ananthanarayanan | | |
| | | | B60L 53/126 | |
| 10,099,785 B1 * | 10/2018 | Gonzalez | B64U 50/31 | |
| 10,176,722 B1 * | 1/2019 | Boyd | G08G 5/57 | |
| 10,268,208 B1 * | 4/2019 | Hopwood Thomas | | |
| | | | G05D 1/0676 | |
| 10,310,501 B2 * | 6/2019 | Greenberger | H02J 7/342 | |
| 10,370,122 B2 * | 8/2019 | Fisher | B60L 53/00 | |
| 10,377,507 B2 * | 8/2019 | Tremblay | B64F 1/32 | |
| 10,467,685 B1 * | 11/2019 | Brisson | B64F 1/222 | |
| 10,526,094 B2 * | 1/2020 | Cheng | B64U 80/70 | |
| 10,719,080 B2 * | 7/2020 | Zhang | B64F 5/60 | |
| 10,745,102 B2 * | 8/2020 | Nysæter | B64U 30/20 | |
| D903,576 S * | 12/2020 | Feldman | D12/345 | |
| 10,967,970 B2 * | 4/2021 | Van Niekerk | B64U 30/293 | |
| 11,079,752 B1 * | 8/2021 | Lombardini | B64U 50/19 | |
| 11,111,033 B1 * | 9/2021 | Burks | B64U 50/34 | |
| D932,369 S * | 10/2021 | Passley | D12/16.1 | |
| 11,148,808 B2 * | 10/2021 | Wiggerich | B64U 30/26 | |
| 11,279,481 B2 * | 3/2022 | Burks | H04W 4/44 | |
| 11,370,561 B2 * | 6/2022 | Ratajczak | B60L 53/14 | |
| 11,427,229 B2 * | 8/2022 | Beckman | G06Q 10/083 | |
| 11,534,801 B2 * | 12/2022 | Volta | B66F 9/063 | |
| 11,603,219 B2 * | 3/2023 | Ratajczak | B64U 30/20 | |
| 11,636,771 B2 * | 4/2023 | Barker | B64U 50/39 | |
| | | | 701/16 | |
| 11,641,966 B2 * | 5/2023 | Nakanishi | A47G 29/124 | |
| | | | 232/44 | |
| 11,673,690 B2 * | 6/2023 | Dayan | B64U 80/70 | |
| | | | 244/114 R | |
| 11,710,092 B2 * | 7/2023 | Dearing | G07C 9/00896 | |
| | | | 705/330 | |
| 11,741,422 B2 * | 8/2023 | Gil | B65G 1/0478 | |
| | | | 705/338 | |
| 11,780,606 B2 * | 10/2023 | Carthew | B64U 70/99 | |
| | | | 244/114 R | |
| 11,814,241 B2 * | 11/2023 | Tian | B60P 3/11 | |
| 11,939,057 B2 * | 3/2024 | Hamm | B64U 20/70 | |
| 11,939,080 B2 * | 3/2024 | Cowden | B64U 80/30 | |
| 12,059,089 B1 * | 8/2024 | Dunn | A47G 29/141 | |
| 12,065,273 B2 * | 8/2024 | Kiyokami | B64U 10/13 | |
| 12,168,533 B1 * | 12/2024 | Hinman | B64U 70/97 | |
| 12,195,213 B2 * | 1/2025 | Qi | B64U 70/97 | |
| 12,214,902 B2 * | 2/2025 | Infanti | B64C 25/62 | |
| 12,240,626 B2 * | 3/2025 | Dolata | B64U 10/60 | |
| 2004/0256519 A1 * | 12/2004 | Ellis | B64F 1/125 | |
| | | | 244/110 E | |
| 2005/0061910 A1 * | 3/2005 | Wobben | B64C 29/00 | |
| | | | 244/17.23 | |
| 2005/0178894 A1 * | 8/2005 | McGeer | B64F 1/06 | |
| | | | 244/63 | |
| 2006/0038067 A1 * | 2/2006 | Dennis | B64U 70/50 | |
| | | | 244/63 | |
| 2006/0249622 A1 * | 11/2006 | Steele | B64U 70/30 | |
| | | | 244/115 | |
| 2007/0176432 A1 * | 8/2007 | Rolt | F03D 9/255 | |
| | | | 290/55 | |
| 2008/0217486 A1 * | 9/2008 | Colten | B64U 10/25 | |
| | | | 244/45 R | |
| 2009/0057486 A1 * | 3/2009 | Becht, IV | B64F 1/007 | |
| | | | 244/114 R | |
| 2010/0170993 A1 * | 7/2010 | Misegades | B64C 7/00 | |
| | | | 244/130 | |
| 2010/0320313 A1 * | 12/2010 | Hanafin | B64F 1/125 | |
| | | | 244/114 R | |
| 2011/0174925 A1 * | 7/2011 | Ying | B64F 1/005 | |
| | | | 701/16 | |
| 2012/0080556 A1 * | 4/2012 | Root, Jr. | B64F 1/06 | |
| | | | 73/170.28 | |
| 2013/0233964 A1 * | 9/2013 | Woodworth | B64U 10/60 | |
| | | | 244/175 | |
| 2013/0344778 A1 * | 12/2013 | Schafer | B24B 41/02 | |
| | | | 451/294 | |
| 2014/0124621 A1 * | 5/2014 | Godzdanker | B64F 1/28 | |
| | | | 244/110 E | |
| 2014/0257595 A1 * | 9/2014 | Tillmann | B64U 10/14 | |
| | | | 701/2 | |
| 2014/0319272 A1 * | 10/2014 | Casado | B60L 3/12 | |
| | | | 244/110 E | |
| 2015/0069968 A1 * | 3/2015 | Pounds | B60L 53/35 | |
| | | | 320/109 | |
| 2015/0123462 A1 * | 5/2015 | Kamradt | B67D 7/02 | |
| | | | 141/192 | |
| 2015/0158599 A1 * | 6/2015 | Sisko | B64F 1/20 | |
| | | | 244/114 R | |
| 2015/0175276 A1 * | 6/2015 | Koster | A47G 29/14 | |
| | | | 244/114 R | |
| 2015/0183528 A1 * | 7/2015 | Walsh | B64F 1/32 | |
| | | | 244/114 R | |
| 2015/0336669 A1 * | 11/2015 | Kantor | G01C 21/343 | |
| | | | 701/3 | |
| 2015/0336677 A1 * | 11/2015 | Smaoui | H02J 7/0045 | |
| | | | 320/109 | |
| 2015/0363843 A1 * | 12/2015 | Loppatto | G06Q 30/0283 | |
| | | | 705/330 | |
| 2016/0001883 A1 * | 1/2016 | Sanz | B64U 10/13 | |
| | | | 244/17.23 | |
| 2016/0003637 A1 * | 1/2016 | Andersen | G01C 21/362 | |
| | | | 701/519 | |
| 2016/0011592 A1 * | 1/2016 | Zhang | G05D 1/10 | |
| | | | 244/114 R | |
| 2016/0023761 A1 * | 1/2016 | McNally | G05D 1/0094 | |
| | | | 701/3 | |
| 2016/0039541 A1 * | 2/2016 | Beardsley | B60L 53/14 | |
| | | | 701/2 | |
| 2016/0068264 A1 * | 3/2016 | Ganesh | G08G 5/55 | |
| | | | 701/4 | |
| 2016/0068265 A1 * | 3/2016 | Hoareau | G06Q 10/08 | |
| | | | 701/3 | |
| 2016/0101856 A1 * | 4/2016 | Kohstall | G05D 1/0669 | |
| | | | 244/17.23 | |

(56) References Cited

U.S. PATENT DOCUMENTS

| | | | |
|---|---|---|---|
| 2016/0130000 A1* | 5/2016 | Rimanelli | B64U 20/50 244/2 |
| 2016/0131025 A1* | 5/2016 | Pekrul | F02B 53/10 123/205 |
| 2016/0144982 A1* | 5/2016 | Sugumaran | B64F 1/005 244/108 |
| 2016/0185466 A1* | 6/2016 | Dreano, Jr. | G06Q 10/083 705/26.81 |
| 2016/0194959 A1* | 7/2016 | Pekrul | F01C 19/06 418/146 |
| 2016/0196756 A1* | 7/2016 | Prakash | G08G 5/54 701/3 |
| 2016/0200438 A1* | 7/2016 | Bokeno | G05D 1/102 244/2 |
| 2016/0207627 A1* | 7/2016 | Hoareau | B64D 1/02 |
| 2016/0229299 A1* | 8/2016 | Streett | B64F 1/222 |
| 2016/0244162 A1* | 8/2016 | Weller | B64U 10/13 |
| 2016/0244187 A1* | 8/2016 | Byers | G06Q 10/0832 |
| 2016/0257423 A1* | 9/2016 | Martin | B64U 50/34 |
| 2016/0257426 A1* | 9/2016 | Mozer | B64F 1/362 |
| 2016/0272317 A1* | 9/2016 | Cho | G08G 1/162 |
| 2016/0280371 A1* | 9/2016 | Canavor | H04W 4/029 |
| 2016/0286128 A1* | 9/2016 | Zhou | H04L 65/762 |
| 2016/0291445 A1* | 10/2016 | Fisher, Sr. | F16M 11/10 |
| 2016/0304198 A1* | 10/2016 | Jourdan | G08G 5/57 |
| 2016/0304217 A1* | 10/2016 | Fisher | G05D 1/0011 |
| 2016/0307448 A1* | 10/2016 | Salnikov | A01C 21/00 |
| 2016/0311329 A1* | 10/2016 | Rodriguez | B60L 58/18 |
| 2016/0340006 A1* | 11/2016 | Tang | B63C 9/01 |
| 2016/0340021 A1* | 11/2016 | Zhang | B64C 27/006 |
| 2016/0355261 A1* | 12/2016 | Chin | B64U 70/20 |
| 2016/0364989 A1* | 12/2016 | Speasl | G08G 5/57 |
| 2016/0378108 A1* | 12/2016 | Paczan | B64C 37/02 705/330 |
| 2017/0011333 A1* | 1/2017 | Greiner | G06K 7/10722 |
| 2017/0015415 A1* | 1/2017 | Chan | G06Q 30/04 |
| 2017/0021941 A1* | 1/2017 | Fisher | B64U 10/20 |
| 2017/0021942 A1* | 1/2017 | Fisher | B64U 70/80 |
| 2017/0023949 A1* | 1/2017 | Fisher | G08G 5/55 |
| 2017/0050749 A1* | 2/2017 | Pilskalns | B60L 53/14 |
| 2017/0073085 A1* | 3/2017 | Tremblay | A47G 29/141 |
| 2017/0081043 A1* | 3/2017 | Jones | B64C 37/02 |
| 2017/0096222 A1* | 4/2017 | Spinelli | B64U 80/25 |
| 2017/0117676 A1* | 4/2017 | James | B64U 70/90 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0144776 A1* | 5/2017 | Fisher | B64U 10/25 |
| 2017/0158352 A1* | 6/2017 | von Flotow | B64C 27/26 |
| 2017/0158353 A1* | 6/2017 | Schmick | B60L 53/12 |
| 2017/0174335 A1* | 6/2017 | Malloy | B64D 35/04 |
| 2017/0190443 A1* | 7/2017 | Fisher | B64F 1/005 |
| 2017/0203632 A1* | 7/2017 | Westendarp | B60H 1/00378 |
| 2017/0203857 A1* | 7/2017 | O'Toole | A47G 29/141 |
| 2017/0225782 A1* | 8/2017 | Kohstall | B64U 30/26 |
| 2017/0225799 A1* | 8/2017 | Selwyn | B64F 1/005 |
| 2017/0225802 A1* | 8/2017 | Lussier | B64U 10/14 |
| 2017/0240291 A1* | 8/2017 | Kim | H01M 16/006 |
| 2017/0247120 A1* | 8/2017 | Miller | B64U 20/83 |
| 2017/0253349 A1* | 9/2017 | Wang | B64U 70/97 |
| 2017/0270314 A1* | 9/2017 | Tsybrovskyy | H04W 12/06 |
| 2017/0275025 A1* | 9/2017 | Johnson | B64F 1/362 |
| 2017/0283090 A1* | 10/2017 | Miller | B64U 70/97 |
| 2017/0305575 A1* | 10/2017 | Bash | B64F 1/32 |
| 2017/0308850 A1* | 10/2017 | Roush | G01C 21/343 |
| 2017/0316701 A1* | 11/2017 | Gil | B60P 3/11 |
| 2017/0323129 A1* | 11/2017 | Davidson | G05D 1/0234 |
| 2017/0327091 A1* | 11/2017 | Capizzo | H01M 10/30 |
| 2017/0341769 A1* | 11/2017 | Haberbusch | F17C 5/007 |
| 2018/0039286 A1* | 2/2018 | Tirpak | B64U 80/25 |
| 2018/0053139 A1* | 2/2018 | Stoman | B64U 10/13 |
| 2018/0056794 A1* | 3/2018 | Kim | B60L 53/126 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/262 |
| 2018/0105289 A1* | 4/2018 | Walsh | B60L 53/30 |
| 2018/0118340 A1* | 5/2018 | Russo | B64U 50/37 |
| 2018/0118374 A1* | 5/2018 | Lombardini | B64F 3/02 |
| 2018/0194484 A1* | 7/2018 | Livieratos | F02D 13/0269 |
| 2018/0196418 A1* | 7/2018 | Meier | G05D 1/0206 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0265295 A1* | 9/2018 | Beckman | G08G 5/57 |
| 2018/0265296 A1* | 9/2018 | Beckman | B64U 70/90 |
| 2018/0295327 A1* | 10/2018 | Yearwood | B25J 11/002 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0354649 A1* | 12/2018 | Ortiz | G08B 13/1436 |
| 2018/0357910 A1* | 12/2018 | Hobbs | B64C 27/00 |
| 2018/0364740 A1* | 12/2018 | Collins | G05D 1/0088 |
| 2018/0370618 A1* | 12/2018 | Harris | B64C 25/24 |
| 2019/0009926 A1* | 1/2019 | Hu | B64U 70/99 |
| 2019/0016476 A1* | 1/2019 | Scherz | H02J 7/0042 |
| 2019/0023133 A1* | 1/2019 | Renold | B60L 53/35 |
| 2019/0023416 A1* | 1/2019 | Borko | B66C 7/08 |
| 2019/0028904 A1* | 1/2019 | Carpenter | G08G 5/76 |
| 2019/0047462 A1* | 2/2019 | Vijayaraghavan | B60W 30/00 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0106224 A1* | 4/2019 | Nishikawa | B64U 80/70 |
| 2019/0108472 A1* | 4/2019 | Sweeney | G06Q 10/083 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | E05F 15/77 |
| 2019/0193952 A1* | 6/2019 | Zevenbergen | B64U 80/25 |
| 2019/0217952 A1* | 7/2019 | Zawadzki | B64D 1/02 |
| 2019/0233103 A1* | 8/2019 | High | A47G 29/141 |
| 2019/0233107 A1* | 8/2019 | Tian | B64C 39/12 |
| 2019/0245365 A1* | 8/2019 | Farrahi Moghaddam | H02J 7/0042 |
| 2019/0256201 A1* | 8/2019 | Plekhanov | B64U 20/40 |
| 2019/0256202 A1* | 8/2019 | Resnick | B64U 10/13 |
| 2019/0256207 A1* | 8/2019 | Nohmi | G05D 1/0866 |
| 2019/0258910 A1* | 8/2019 | Stoman | G06K 19/06028 |
| 2019/0263519 A1* | 8/2019 | Argus | B64U 50/11 |
| 2019/0270526 A1* | 9/2019 | Hehn | B64U 80/70 |
| 2019/0283871 A1* | 9/2019 | Wieczorek | B64U 10/60 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B64U 50/39 |
| 2019/0348862 A1* | 11/2019 | Obayashi | H02J 50/90 |
| 2019/0383052 A1* | 12/2019 | Blake | G08G 5/22 |
| 2020/0017218 A1* | 1/2020 | Ahmad | B64D 9/00 |
| 2020/0017237 A1* | 1/2020 | Walker | B64F 1/362 |
| 2020/0036243 A1* | 1/2020 | Zhao | H02K 1/145 |
| 2020/0044463 A1* | 2/2020 | Kim | B64U 10/14 |
| 2020/0055613 A1* | 2/2020 | Miller | G05D 1/0676 |
| 2020/0062373 A1* | 2/2020 | Liao | B64U 10/16 |
| 2020/0094957 A1* | 3/2020 | Sohmshetty | B60P 3/11 |
| 2020/0148322 A1* | 5/2020 | Pekrul | B63H 5/02 |
| 2020/0165008 A1* | 5/2020 | Krauss | B64U 80/25 |
| 2020/0180940 A1* | 6/2020 | Rainville | B64F 1/28 |
| 2020/0189731 A1* | 6/2020 | Mistry | H04B 7/18502 |
| 2020/0207484 A1* | 7/2020 | Foggia | B64U 70/92 |
| 2020/0218287 A1* | 7/2020 | Wang | B64U 50/34 |
| 2020/0218288 A1* | 7/2020 | Johnson | B64U 30/26 |
| 2020/0225684 A1* | 7/2020 | Anderson | B64U 70/95 |
| 2020/0239160 A1* | 7/2020 | Cheng | B64F 1/22 |
| 2020/0247540 A1* | 8/2020 | Jones | B64D 7/08 |
| 2020/0262583 A1* | 8/2020 | Ducharme | B64U 70/97 |
| 2020/0290752 A1* | 9/2020 | Kolosiuk | B64U 70/30 |
| 2020/0301445 A1* | 9/2020 | Jourdan | G06K 19/06037 |
| 2020/0309489 A1* | 10/2020 | Kadavanich | F41J 9/08 |
| 2020/0349852 A1* | 11/2020 | DiCosola | G08G 5/55 |
| 2020/0369408 A1* | 11/2020 | Dolata | B60L 53/16 |
| 2020/0398999 A1* | 12/2020 | Ortiz | G07C 9/00309 |
| 2020/0406773 A1* | 12/2020 | Lacaze | G05D 1/0094 |
| 2021/0031947 A1* | 2/2021 | Wankewycz | E04H 6/44 |

(56) References Cited

U.S. PATENT DOCUMENTS

| | | | |
|---|---|---|---|
| 2021/0045564 A1* | 2/2021 | Duckers | E06B 3/483 |
| 2021/0047055 A1* | 2/2021 | Lee | B64F 1/36 |
| 2021/0053677 A1* | 2/2021 | Passley | B64U 70/95 |
| 2021/0070468 A1* | 3/2021 | Svirsky | B64U 80/25 |
| 2021/0086913 A1* | 3/2021 | Friedman | B64F 1/362 |
| 2021/0107684 A1* | 4/2021 | Le Lann | B60L 53/52 |
| 2021/0122495 A1* | 4/2021 | Rezvani | B64F 1/007 |
| 2021/0125503 A1* | 4/2021 | Henry | G05D 1/606 |
| 2021/0148131 A1* | 5/2021 | Wankewycz | B64U 70/92 |
| 2021/0214102 A1* | 7/2021 | Geng | G08G 5/22 |
| 2021/0237694 A1* | 8/2021 | Hirschvogel | B60J 7/16 |
| 2021/0237899 A1* | 8/2021 | Warwick | B64C 39/024 |
| 2021/0253242 A1* | 8/2021 | Falk-Petersen | B64U 80/40 |
| 2021/0276735 A1* | 9/2021 | Raptopoulos | A47G 29/141 |
| 2021/0284356 A1* | 9/2021 | Jourdan | G08G 5/55 |
| 2021/0300591 A1* | 9/2021 | Tian | B64F 1/007 |
| 2021/0354820 A1* | 11/2021 | Hiller | B60L 53/12 |
| 2021/0394930 A1* | 12/2021 | O'Toole | A47G 29/30 |
| 2022/0019247 A1* | 1/2022 | Dayan | B64F 1/222 |
| 2022/0041279 A1* | 2/2022 | Rowse | G05D 1/104 |
| 2022/0041299 A1* | 2/2022 | Wankewycz | B64U 50/31 |
| 2022/0055770 A1* | 2/2022 | O'Toole | B60L 53/80 |
| 2022/0073214 A1* | 3/2022 | Liske | B64F 1/32 |
| 2022/0106125 A1* | 4/2022 | Ragan | F16G 3/10 |
| 2022/0119105 A1* | 4/2022 | Schmalzried | G05D 1/695 |
| 2022/0169401 A1* | 6/2022 | Di Cosola | B64U 70/95 |
| 2022/0234757 A1* | 7/2022 | Dayan | B64U 80/70 |
| 2022/0242589 A1* | 8/2022 | Pham | G09F 27/005 |
| 2022/0380063 A1* | 12/2022 | Shah | B64F 1/362 |
| 2023/0023246 A1* | 1/2023 | McLaughlin | G05D 1/0088 |
| 2023/0031028 A1* | 2/2023 | Ehasoo | B64U 80/10 |
| 2023/0088830 A1* | 3/2023 | Kim | B64U 50/32 244/221 |
| 2023/0096139 A1* | 3/2023 | Ubaldi | B65G 23/44 198/844.1 |
| 2023/0100169 A1* | 3/2023 | Laczak | A47G 29/141 232/1 R |
| 2023/0159192 A1* | 5/2023 | Gil | B64U 80/40 244/137.1 |
| 2023/0202682 A1* | 6/2023 | Kiyokami | B64U 70/90 244/114 R |
| 2023/0202691 A1* | 6/2023 | Kiyokami | B64U 80/86 244/114 R |
| 2024/0278946 A1* | 8/2024 | Roberts | B64U 10/16 |
| 2024/0336378 A1* | 10/2024 | Neate | B64U 70/50 |
| 2024/0391616 A1* | 11/2024 | Dayan | B64U 70/90 |
| 2025/0002185 A1* | 1/2025 | Liu | B64U 80/70 |
| 2025/0026509 A1* | 1/2025 | Infanti | B64U 70/50 |
| 2025/0121966 A1* | 4/2025 | Gronstedt | B64U 80/10 |
| 2025/0145314 A1* | 5/2025 | Gronstedt | B64F 1/322 |

FOREIGN PATENT DOCUMENTS

| | | | |
|---|---|---|---|
| CN | 112079065 A | 12/2020 | |
| WO | 2019232753 A1 | 12/2019 | |
| WO | WO 2019232753 | * 12/2019 | B64F 1/00 |

OTHER PUBLICATIONS

International Search Report issued in application No. PCT/EP2022/075714 dated Feb. 6, 2023.

* cited by examiner

LANDING PLATFORM

The subject matter of the invention is a landing platform for a drone.

Transport drones in the form of multicopters and drones which can fly from a starting point to a destination point in a manner which is autonomous or remote controlled are known. Apparatuses for receiving consignments which have been transported by a drone are likewise known.

It is an object of the invention to provide a landing platform for a drone, which landing platform makes it possible that the drone can collect an item to be transported such as a package.

The object is achieved by way of a landing platform as claimed patent claim 1. Further advantageous embodiments are the subject matter of the subclaims or are described in the following text.

The landing platform according to the invention makes it possible in an advantageous way that, after it lands on the landing surface, a drone is conveyed automatically into a position, in which the drone can collect, for example pick up, an item to be transported. Here, the drone can not only fly and land autonomously, but rather can preferably also control the landing platform, in order to be moved by the conveyor belts and sliding bars into the suitable position and to receive an item to be transported provided for collecting from the lifting apparatus.

The drone conveyor belts are preferably configured as module conveyor belts. The individual elements of the module conveyor belts are preferably at least partially open, with the result that moisture can run off.

The landing surface, the sliding bars and the fitting unit are preferably attached to a framework.

The drone conveyor belts are preferably driven via an electric motor.

The sliding bars can preferably displace a drone in such a way that the drone is in contact at the same time with the two drone conveyor belts. Skids which are enclosed by a landing frame of the drone can preferably be moved by way of the sliding bars into a position parallel to the running direction of the drone conveyor belts. The sliding bars are preferably driven via a chain drive. The sliding bars are preferably made from profiled stainless steel. The sliding bars, when they move away from one another, can preferably push foreign objects situated on the landing surface such as, for example, small branches or leaves outward from the landing surface. The two end positions of a sliding bar ("outside" and "inside") are preferably limited mechanically. The two end positions of the sliding bars ("outside" and "inside") are preferably scanned by sensor.

In the case of the movement of the drone into the loading position, a landing frame of the drone is preferably aligned on a stop edge. In the case of the movement of the drone into the loading position, skids of a landing frame of the drone are preferably moved under two hold-down brackets. Reaching of the loading position is preferably scanned by way of a sensor system. Hold-down brackets preferably hold a landing frame of the drone while the drone collects an item to be transported which is arranged on the lifting apparatus.

The lifting apparatus is preferably configured as a scissors-type lifting table. The scissors-type lifting table can preferably be adjusted vertically via a self-locking spindle drive. The end positions of the lifting apparatus are preferably detected via sensors. The end positions of the lifting apparatus are preferably secured by way of safety stops against damage. The lifting apparatus is preferably driven via an electric motor and a flange-connected gear mechanism. The landing surface preferably has a size of at least 1.8 m by 1.8 m. This size makes it possible that the drone can land safely on the landing surface even when the drone is not ensured relatively accurate landings on account of external conditions or on account of inaccuracies in the control or localization.

Figure 2:
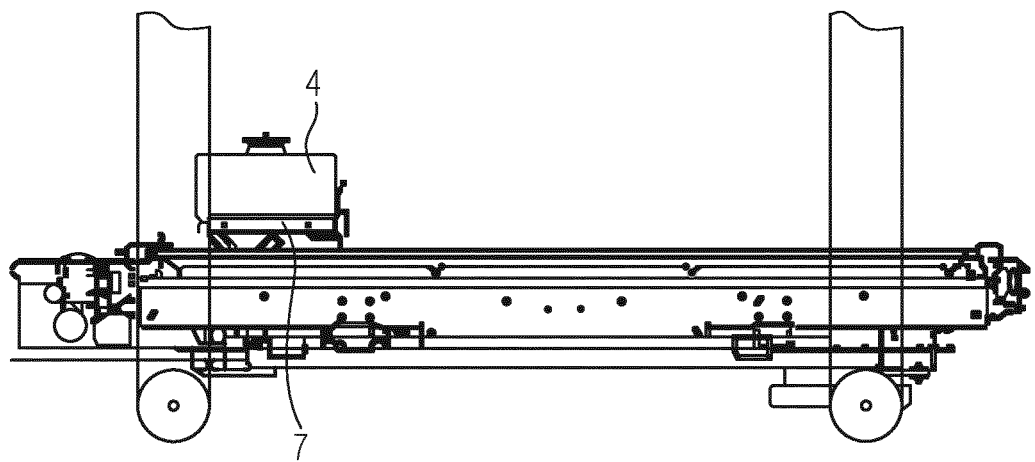
Figure 3:
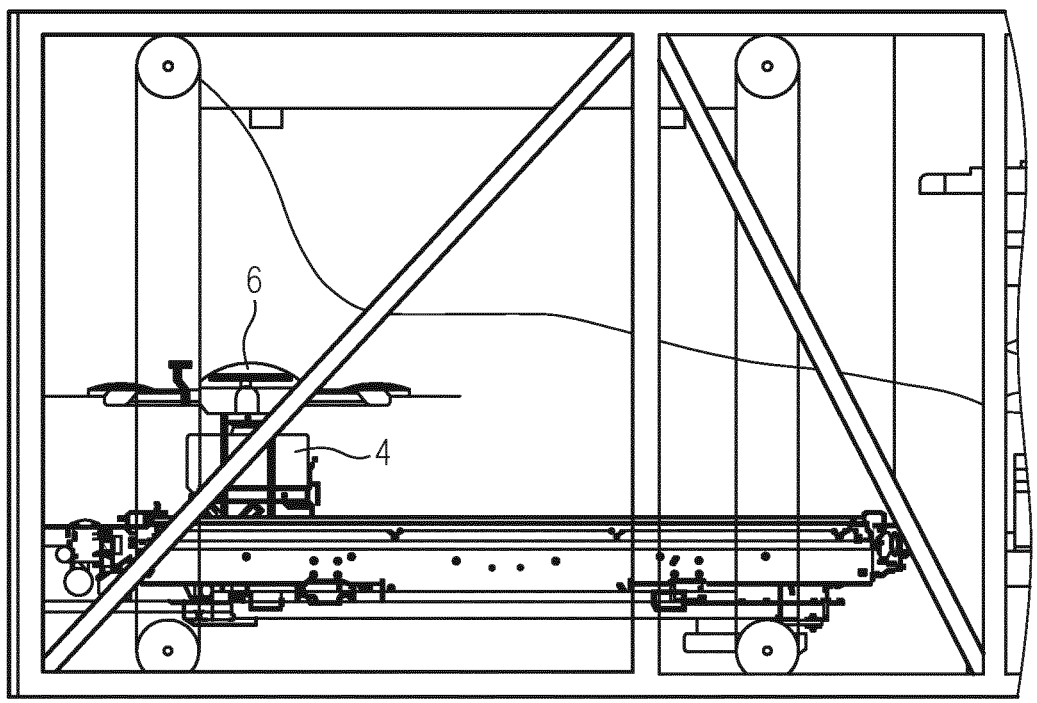
Figure 4:
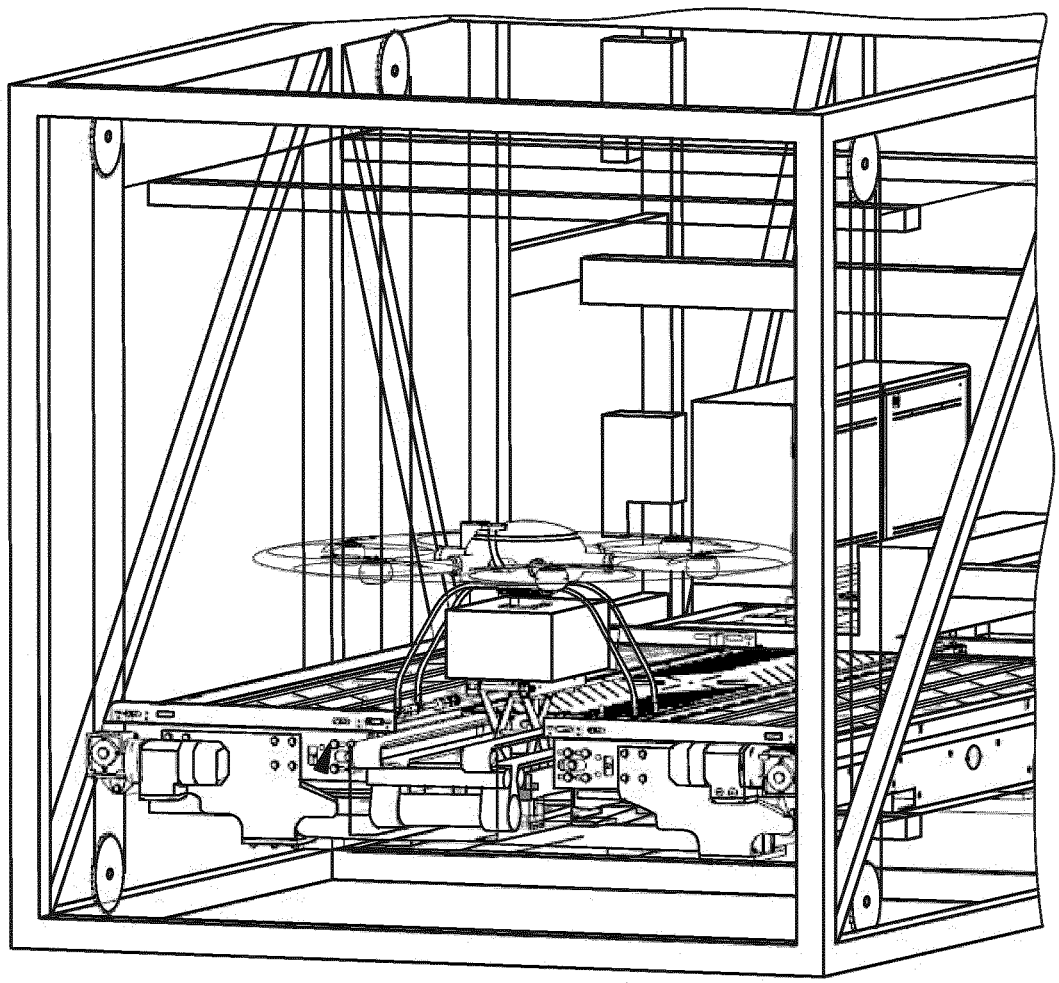
Figure 5:
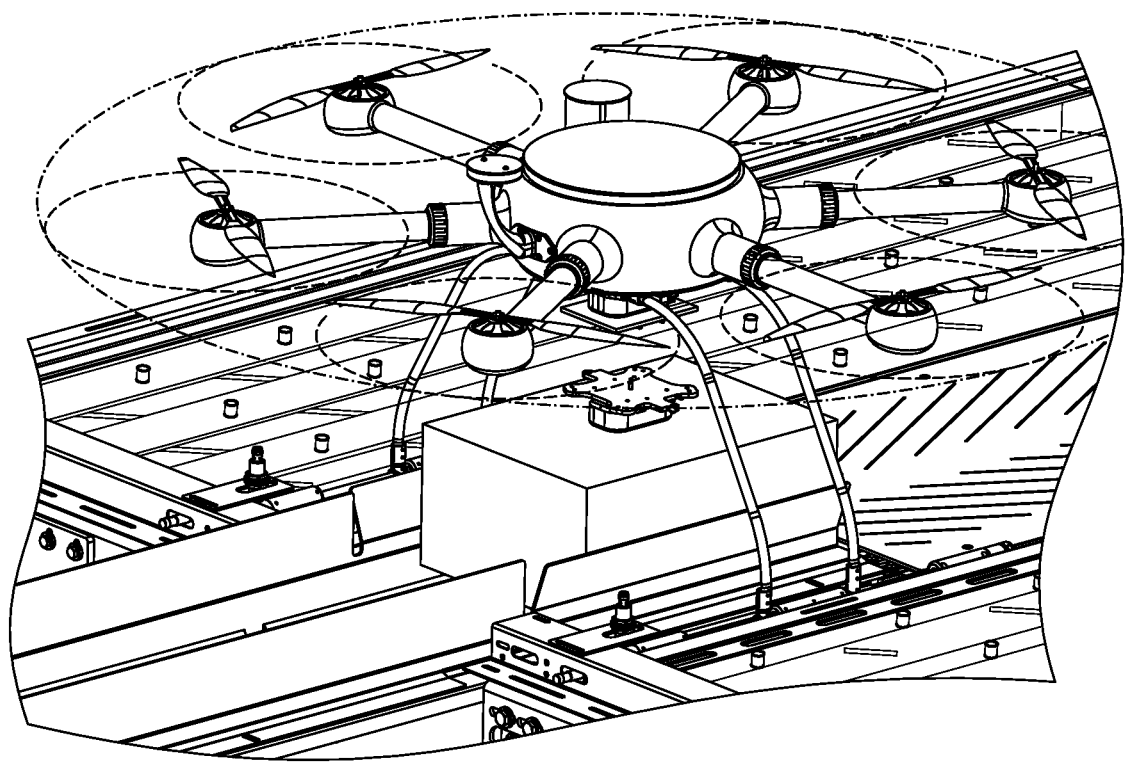
Figure 6:
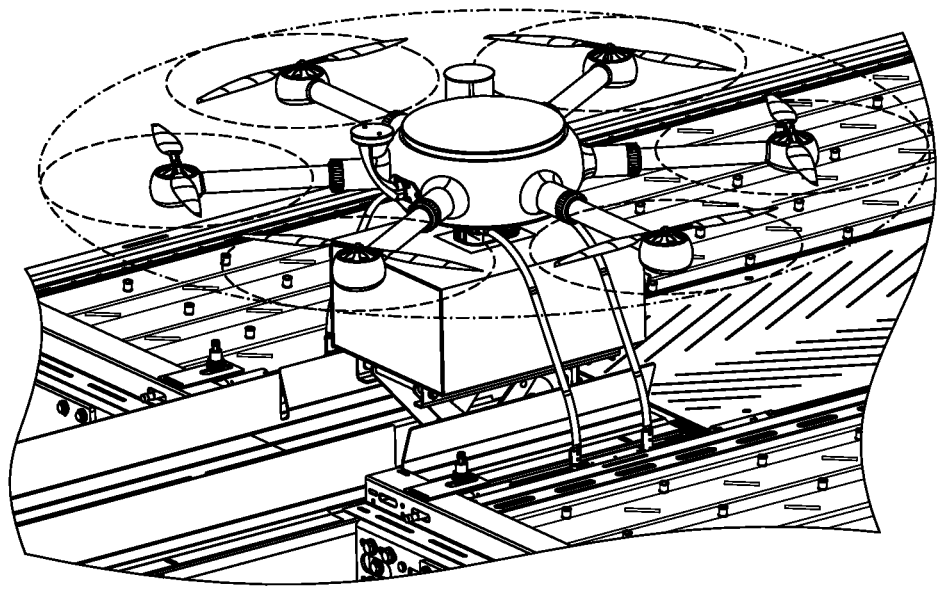

The invention will be explained in greater detail on the basis of the figures which show one exemplary embodiment and in which:

FIG. 1 shows a landing platform according to the invention with a drone and an item to be transported, FIG. 2 shows a side view of a landing platform according to the invention with an item to be transported, FIG. 3 shows a side view of a landing platform according to the invention with a drone and an item to be transported, FIG. 4 shows a landing platform according to the invention with a drone and an item to be transported, FIG. 5 shows a landing platform according to the invention with a drone and an item to be transported which has not been collected, and FIG. 6 shows a landing platform according to the invention with a drone with an item to be transported which has been collected.

FIG. 1 shows a landing platform 1 comprising a landing surface which comprises two conveyor belts 2 which are arranged in parallel in the same horizontal plane and are spaced apart in such a way that a drone 6 standing on the landing surface can be in contact at the same time with the two conveyor belts 2 (drone conveyor belts 2), and two sliding bars 3 which each run parallel to the running direction of the drone conveyor belts 2 and can be moved toward one another above the drone conveyor belts 2 in a direction transversely with respect to the running direction of the drone conveyor belts 2, with the result that they can displace the drone 6 standing on the landing surface. The fitting unit 5 comprises a lifting apparatus 7, arranged between the drone conveyor belts 2, for a cuboid item to be transported 4. The drone 6 standing on the landing surface has been moved by way of movement of the drone conveyor belts 2 and/or movement of the sliding bars 3 into a position, in which the drone 6 can collect the item to be transported 4 which is arranged on the lifting apparatus (loading position). The fitting unit 5 also comprises a conveyor belt 8 for moving the item to be transported 4 onto the lifting apparatus 7 (transport item conveyor belt 8). The sliding bars 3 can displace the drone 6 in such a way that the drone 6 is in contact at the same time with the two drone conveyor belts 2. The drone 6 comprises a landing frame with skids which can be moved by way of the sliding bars 3 into a position parallel to the running direction of the drone conveyor belts 2. The landing frame of the drone 6 has been aligned on a stop edge in the case of the movement into the loading position.

FIG. 2 shows, in particular, a lifting apparatus 7 which belongs to the fitting unit 5 and is configured as a scissors-type lifting table. The item to be transported 4 is situated on the lifting apparatus.

FIGS. 3 and 4 likewise show, in particular, the lifting apparatus 7 which belongs to the fitting unit 5 and is configured as a scissors-type lifting table. The item to be transported 4 is situated on the lifting apparatus, with the result that the former can be gripped by the drone 6.

The invention claimed is:

1. A landing platform for a drone comprising
a landing surface comprising
two conveyor belts arranged in parallel in the same horizontal plane and spaced apart such that a drone landing on the landing surface is in contact at the same time with the two conveyor belts (drone conveyor belts), two sliding bars which each run at least partially parallel to the running direction of the drone conveyor belts and are movable above the drone conveyor belts in a direction transversely with respect to the running direction of the drone conveyor belts, and a fitting unit comprising a lifting apparatus, arranged between the drone conveyor belts, for an item to be transported, wherein the drone conveyor belts and/or movement of the sliding bars are configured to move the drone into a loading position on the landing surface for the drone to collect from the lifting apparatus the item to be transported (loading position).

2. The landing platform as claimed in claim 1, wherein the fitting unit comprises a conveyor belt for moving the item to be transported onto the lifting apparatus (transport item conveyor belt).

3. The landing platform as claimed in claim 1, wherein the drone conveyor belts are configured as module conveyor belts.

4. The landing platform as claimed in claim 3, wherein the individual elements of the module conveyor belts are at least partially open to permit moisture run-off.

5. The landing platform as claimed in claim 1, wherein the landing surface, the sliding bars and the fitting unit are attached to a framework.

6. The landing platform as claimed in claim 1, wherein the drone conveyor belts are driven via an electric motor.

7. The landing platform as claimed in claim 1, wherein the sliding bars are configured to displace the drone while maintaining simultaneous contact between the drone and the two drone conveyor belts.

8. The landing platform as claimed in claim 1, wherein the sliding bars are configured to move skids enclosed by a landing frame of the drone into a position parallel to the running direction of the drone conveyor belts.

9. The landing platform as claimed in claim 1, wherein the sliding bars are driven via a chain drive.

10. The landing platform as claimed in claim 1, wherein the sliding bars are made from profiled stainless steel.

11. The landing platform as claimed in claim 1, wherein the sliding bars, are configured to push foreign objects situated on the landing surface outward from the landing surface.

12. The landing platform as claimed in claim 1, wherein two end positions of a sliding bar ("outside" and "inside") are limited mechanically.

13. The landing platform as claimed in claim 1, further comprising a sensor for scanning end positions of the sliding bars ("outside" and "inside").

14. The landing platform as claimed in claim 1, wherein, in the case of the movement of the drone into the loading position, a landing frame of the drone is aligned on a stop edge.

15. The landing platform as claimed in claim 1, wherein, in the case of the movement of the drone into the loading position, skids of a landing frame of the drone are moved under two hold-down brackets.

16. The landing platform as claimed in claim 1, further comprising a sensor system for determining reaching of the loading position.

17. The landing platform as claimed in claim 1, wherein hold-down brackets hold a landing frame of the drone while the drone collects an item to be transported that is arranged on the lifting apparatus.

18. The landing platform as claimed in claim 1, wherein the lifting apparatus is configured as a scissor lift table.

19. The landing platform as claimed in claim 17, wherein the scissor lift table can be adjusted vertically via a self-locking spindle drive.

20. The landing platform as claimed in claim 1, wherein end positions of the lifting apparatus are detected via sensors.

21. The landing platform as claimed in claim 1, wherein end positions of the lifting apparatus are secured by safety stops against damage.

22. The landing platform as claimed in claim 1, wherein the lifting apparatus is driven via an electric motor and a flange-connected gear mechanism.

23. The landing platform as claimed in claim 1, wherein the landing surface has a size of at least 1.8 m by 1.8 m.

24. The landing platform as claimed in claim 1, wherein the landing platform is controlled by the drone.

* * * * *